United States Patent
Gamlin et al.

(10) Patent No.: US 6,828,385 B2
(45) Date of Patent: Dec. 7, 2004

(54) PROCESS FOR CROSSLINKING CARBOXYLATED NITRILE RUBBER, HYDROGENATING CARBOXYLATED NITRILE RUBBER, THE CROSSLINKED RUBBER AND ITS' USES

(75) Inventors: Janet N. Gamlin, Sarnia (CA); Sharon X. Guo, Stratford (CA)

(73) Assignee: Bayer Inc., Sarnia (CA)

( * ) Notice: Subject to any disclaimer, the term of this patent is extended or adjusted under 35 U.S.C. 154(b) by 0 days.

(21) Appl. No.: 10/266,722

(22) Filed: Oct. 8, 2002

(65) Prior Publication Data

US 2003/0109642 A1 Jun. 12, 2003

(30) Foreign Application Priority Data

Oct. 12, 2001 (CA) .............................. 2358947

(51) Int. Cl.$^7$ .............................. C08F 8/04; C08L 33/20
(52) U.S. Cl. ...................... 525/230; 525/233; 525/244; 525/294; 525/301; 525/262; 525/329.1; 525/329.3; 525/338; 525/339; 525/340
(58) Field of Search .................. 525/230, 233, 525/244, 294, 301, 262, 329.1, 329.3, 338, 339, 340

(56) References Cited

U.S. PATENT DOCUMENTS

| | | | | |
|---|---|---|---|---|
| 4,525,517 A | * | 6/1985 | Sato ........................... | 524/394 |
| 4,952,634 A | * | 8/1990 | Grossman .................... | 525/190 |
| 5,157,083 A | | 10/1992 | Aonuma et al. ............. | 525/285 |
| 5,231,138 A | * | 7/1993 | Aonuma et al. ............. | 525/179 |
| 6,207,752 B1 | | 3/2001 | Abraham et al. ............. | 525/97 |
| 6,410,653 B1 | * | 6/2002 | Fujii et al. ................... | 525/285 |

FOREIGN PATENT DOCUMENTS

| | | |
|---|---|---|
| CA | 2 308 876 | 11/2001 |
| EP | 0 933 381 | 8/1999 |

OTHER PUBLICATIONS

Chemical Abstracts 1996:265058 & JP 08035562.
Kautschuk + Gummi Kunststoffe, vol. 42, (month unavailable) 1989, D. Brück, pp. 107–110, "IR-Spectrometric Determination of the Proportions of Acrylonitrile, Butadiene and Hydrogenated Butadiene in Hydrogenated Acrylonitrile–Butadiene Rubbers" (Part 1).
Kautschuk + Gummi Kunststoffe, vol. 42, (month unavailable) 1989, D. Brück, pp. 194–197, IR-Spectrometric Determination of the Proportions of Acrylonitrile, Butadiene and Hydrogenated Butadiene in Hydrogenated Acrylonitrile–Butadiene Rubbers (HNBR) (Part 2).
Organic Chemistry, (month unavailable) 1987, K. Peter C. Vollhardt, pp. 747–789.
Elastomers & Rubber Compounding Materials, (month unavailable) 1989, I. Franta et al, pp. 325–494, "Compounding materials and special purpose additives".

* cited by examiner

Primary Examiner—James J. Seidleck
Assistant Examiner—Olga Asinovsky
(74) Attorney, Agent, or Firm—Godfried R. Akorli; Jennifer R. Senk

(57) ABSTRACT

A process has now been discovered that permits the simultaneous crosslinking and derivation of an, optionally hydrogenated, polymer whose backbone is composed of a conjugated diene, an unsaturated nitrile and an unsaturated carboxylic acid in the presence of a coupling/condensing agent. This permits the preparation of a novel polymeric material that is an optionally hydrogenated polymer of a conjugated diene, an unsaturated nitrile and a derived unsaturated acid. It has also been found that this novel polymeric material has unexpected and valuable properties.

13 Claims, 4 Drawing Sheets

PROCESS FOR CROSSLINKING CARBOXYLATED NITRILE RUBBER, HYDROGENATING CARBOXYLATED NITRILE RUBBER, THE CROSSLINKED RUBBER AND ITS' USES

FIELD OF THE INVENTION

The present invention relates to novel crosslinked polymers, to processes for preparing the novel crosslinked polymers and to uses thereof.

BACKGROUND OF THE INVENTION

Polymers of conjugated dienes and unsaturated nitriles, i.e. nitrile rubbers are known. It is also known to hydrogenate these. This improves the heat-aging properties of the polymer. When doing so care is needed to ensure that only hydrogenation of carbon-carbon double bonds occurs. Hydrogenation of the nitrile moieties is to be avoided, as any reduction of the nitrile groups has an undesired and deleterious effect on the properties of the nitrile rubber; in particular it reduces the oil resistance of the nitrile rubber.

It has been proposed to include various additional copolymerizable monomers in nitrile rubbers. Among the copolymerizable monomers mentioned are alpha,beta-unsaturated mono- and dicarboxylic acids. These can be incorporated into the polymer backbone, but difficulty has been encountered when polymers containing carboxyl groups are hydrogenated. Particularly if the degree of hydrogenation is high, the carboxyl groups have undergone reduction or other side reactions, which has resulted in an unsatisfactory product.

To avoid the problem of hydrogenation of the carboxyl groups it has been proposed to prepare a nitrile rubber composed of a conjugated diene and an unsaturated nitrile, to partially hydrogenate this nitrile rubber and thereafter to add alpha,beta-unsaturated acid; see U.S. Pat. No. 5,157,083. This approach has not proven satisfactory. As the acid is added after the formation of the nitrile rubber, the acid moieties are not distributed randomly or alternately along the backbone of the polymer. Terpolymerization of a conjugated diene, unsaturated nitrile and unsaturated acid results in a polymer in which the α and β carbon atoms of the acid form part of the main carbon backbone of the polymer. In contrast, polymerization of conjugated diene and nitrile results in a polymer that has some carbon-carbon double bonds in a vinyl side chain, from 1,2-polymeriztion of butadiene, and some carbon-carbon double bonds in the main polymer backbone, from 1,4-polymerization of butadiene. These double bonds in the main polymer backbone may be in the cis or in the trans configuration. When the polymer undergoes hydrogenation, the vinyl groups undergo hydrogenation first, followed by the double bonds in the cis configuration. Therefore, the partially hydrogenated polymer to which the α,β-unsaturated acid is added contains mostly or entirely double bonds in the main polymer backbone and in the trans configuration. Reaction with the unsaturated acid results in a product in which the α and β carbon atoms of the acid are not in the main carbon backbone of the polymer. Accordingly, the chemical structure of a polymer made in this latter way differs from the chemical structure of the statistical polymers that is formed by the terpolymerization of a conjugated diene, an unsaturated nitrile and an unsaturated acid, where the monomers are statistically or randomly distributed throughout the polymer chain.

European Patent Application No. 933381 discloses carboxylated nitrile-group-containing highly saturated copolymer rubber, and discusses three processes for adding maleic anhydride to a nitrile-group-containing highly saturated copolymer rubber. The European application refers to "a highly saturated copolymer rubber", but it is believed that some degree of unsaturation in the rubber is required, to serve as reaction sites for addition of the maleic anhydride. Disadvantages of all three processes for adding maleic anhydride are mentioned, and it is disclosed that no satisfactory industrial process has been found. Furthermore, the product of the addition, i.e., the maleic anhydride-nitrile-group-containing polymer is said to be unsatisfactory in various properties, including "abrasion resistance and tensile strength which are required for belts and hoses."

Preparing a carboxylated, hydrogenated nitrile rubber by first preparing a nitrile rubber, then hydrogenating and thereafter adding an unsaturated acid results in an expensive production process. Furthermore, it is difficult to control the amount of acid that adds to the polymer so the quality of the product is uncertain. A product made in this way was introduced commercially but has since been withdrawn from the market.

The reactive sites of hydrogenated nitrile rubber are the double bonds. Japanese Patent JP 08035562 A2 (Chemical Abstracts 1996:265058) addresses the uses of polycarbodiimide pulp and hydrogenated nitrile rubbers reactive to a carbodiimide group. The reaction occurs between the polymer's double bonds and not a carboxylic acid monomer.

Carbodiimides are disclosed as a curative in thermoplastic blends of polyester, polycarbonates and the like in the presence of nitrile rubbers in WO 99/29773-A1. The thermoplastic blend exhibits no rubbery properties present in this invention.

SUMMARY OF THE INVENTION

A process has now been discovered that permits the simultaneous crosslinking and derivation of an, optionally hydrogenated, polymer whose backbone contains units derived from at least one conjugated diene monomer, units derived from at least one unsaturated nitrile monomer and units derived from at least one unsaturated carboxylic acid monomer in the presence of a coupling/condensing agent. This permits the preparation of a novel polymeric material that is an, optionally hydrogenated, polymer containing units derived from at least one conjugated diene monomer, units derived from at least one unsaturated nitrile monomer and units derived from at least one derived unsaturated acid monomer. It has also been found that this novel polymeric material has unexpected and valuable properties.

Accordingly, in one aspect, the present invention provides an, optionally hydrogenated, polymer containing units derived from at least one conjugated diene monomer, units derived from at least one unsaturated nitrile monomer and units derived from at least one derivatized unsaturated acid monomer.

In another aspect, the present invention provides a process for the simultaneous crosslinking and derivation of an, optionally hydrogenated, polymer comprising units derived from at least one conjugated diene monomer, units derived from at least one unsaturated nitrile monomer and units derived from at least one derived unsaturated acid monomer which includes subjecting the polymer to a crosslinking process in the presence of at least one coupling/condensing agent.

DETAILED DESCRIPTION OF THE INVENTION

Figure 1:
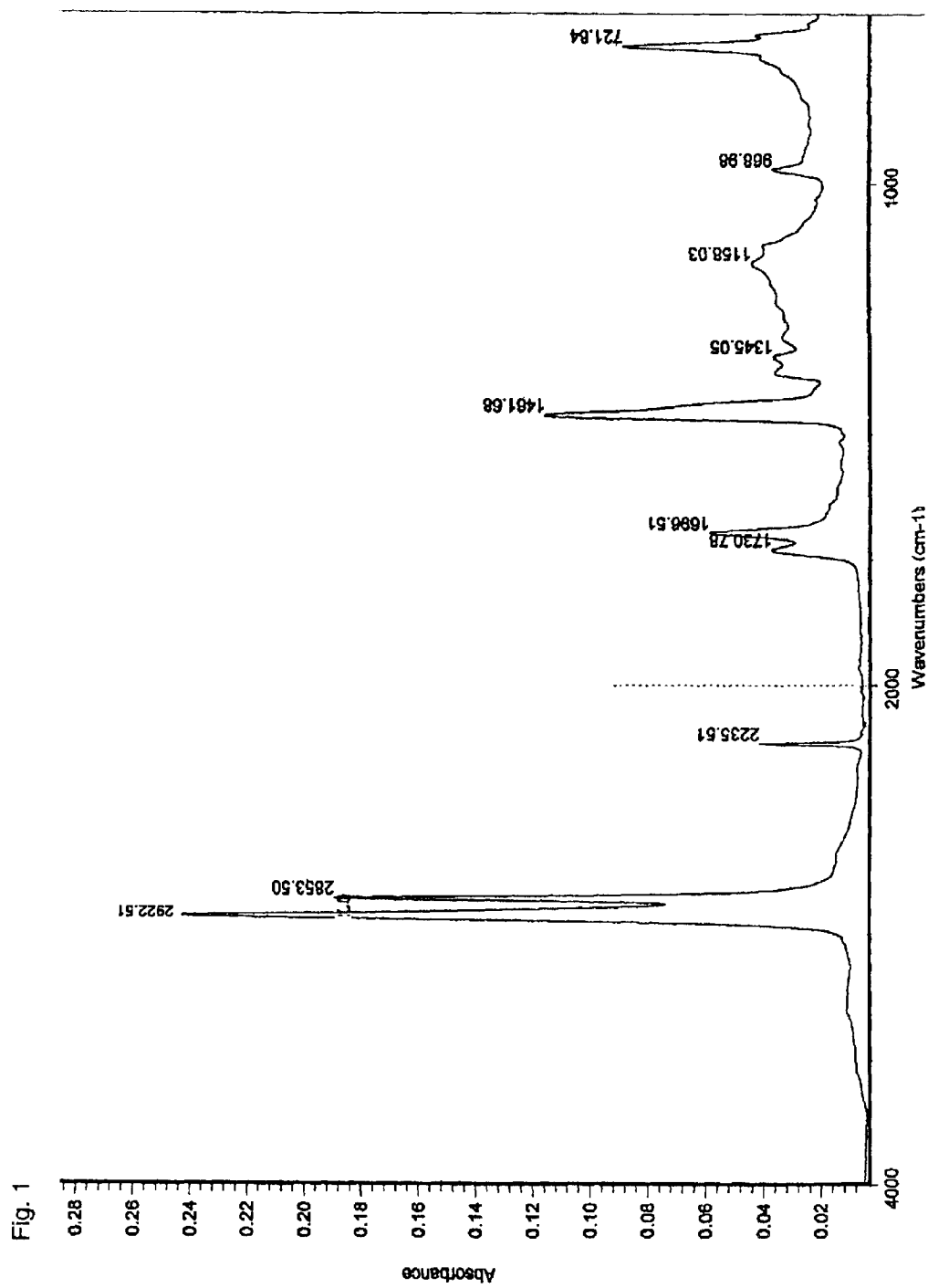
FIG. 1 illustrates the ATR (Attenuated Total Reflectance) spectrum of hydrogenated carboxylated nitrile rubber.
Figure 2:
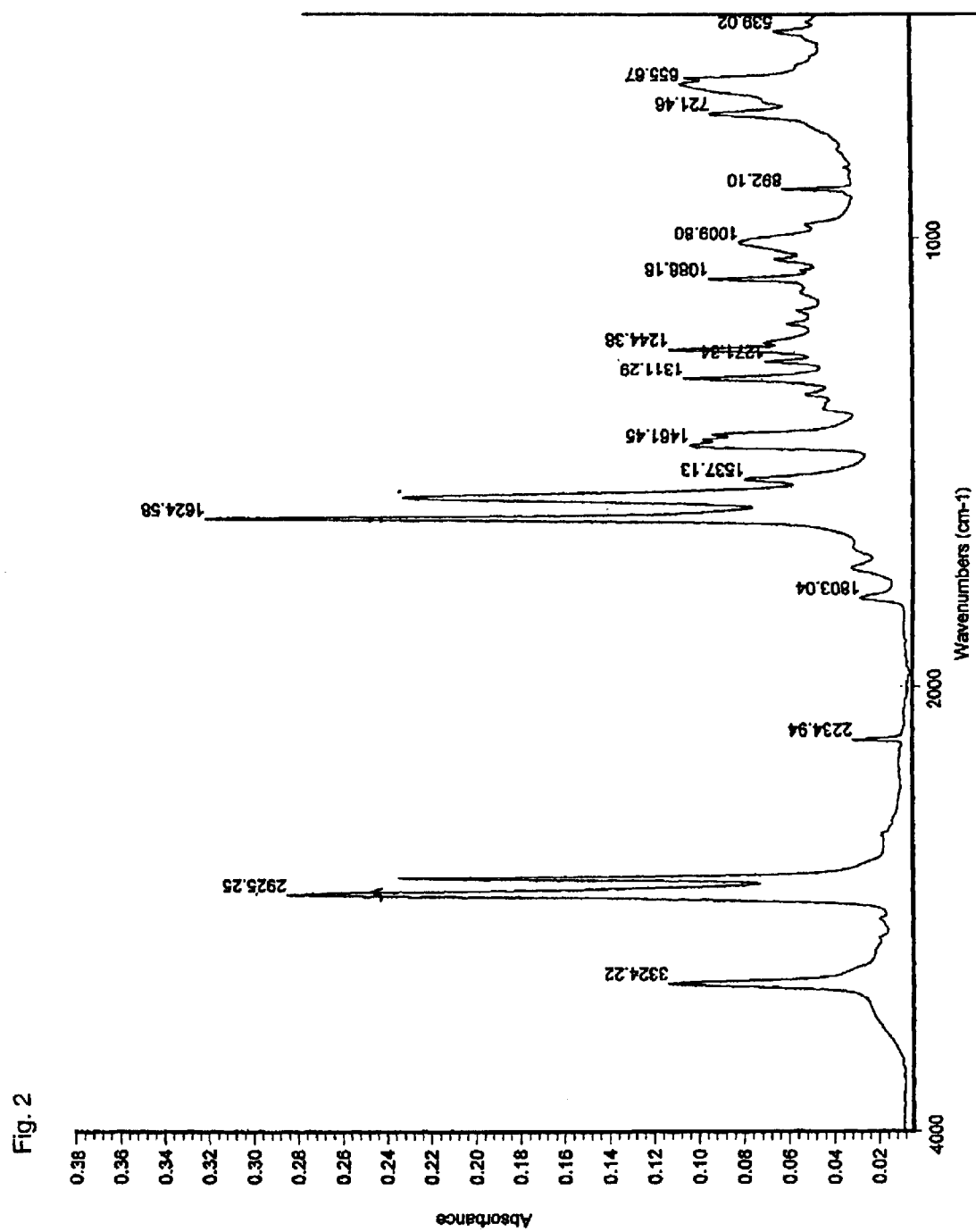
FIG. 2 illustrates the ATR (Attenuated Total Reflectance) spectrum of the reaction between HXNBR and DCC (3.75 prh).
Figure 3:
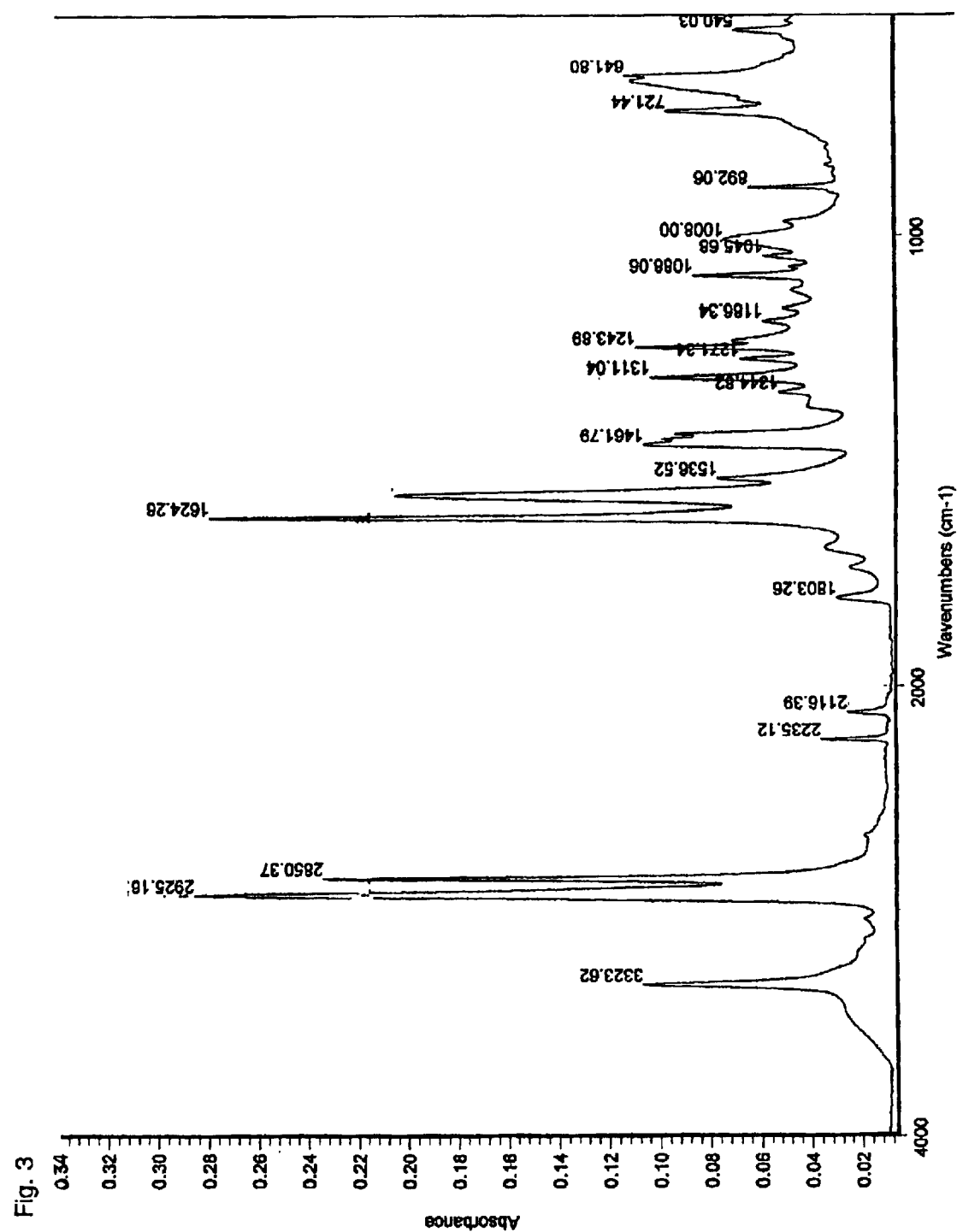
FIG. 3 illustrates the ATR (Attenuated Total Reflectance) spectrum of the reaction between HXNBR and DCC (12 prh).
Figure 4:
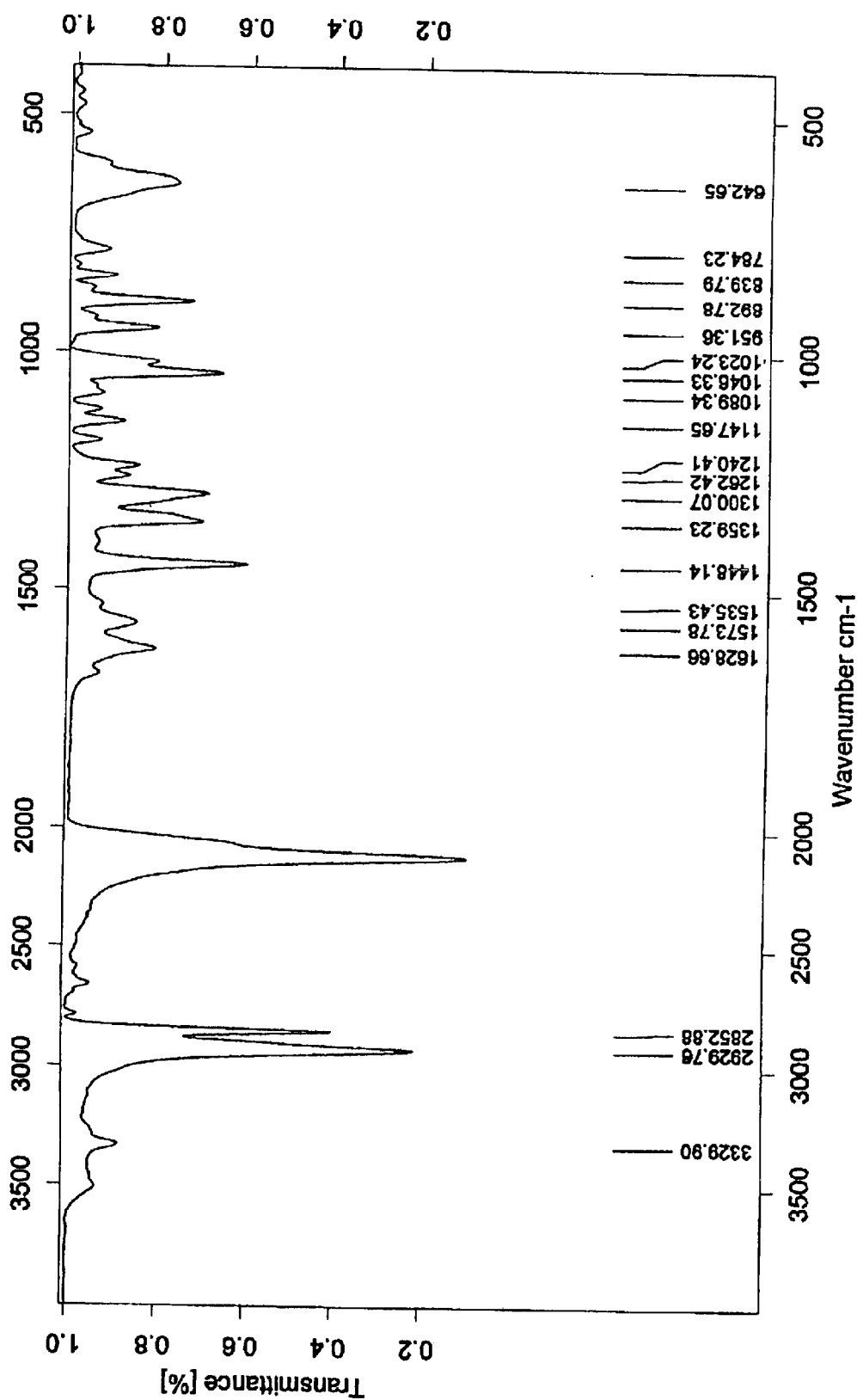
FIG. 4 illustrates the infrared spectrum of dicyclohexylcarbodiimide.

Many conjugated dienes are used in nitrile rubbers and these may all be used in the present invention. Mention is made of 1,3-butadiene, isoprene, 2,3-dimethyl-1,3-butadiene, 1,3-pentadiene and piperylene, of which 1,3-butadiene is preferred.

The nitrile is preferably acrylonitrile or methacrylonitrile or α-chloro-acrylonitrile, of which acrylonitrile is more preferred.

The unsaturated acid monomer is preferably an alpha, beta-unsaturated acid such as acrylic, methacrylic, ethacrylic, crotonic, maleic (possibly in the form of its anhydride), fumaric or itaconic acid, of which acrylic and methacrylic are more preferred.

The conjugated diene preferably constitutes in the range of from 40 to 85% of the polymer, the nitrile preferably constitutes in the range of from 14.9 to 50% of the polymer and the acid preferably in the range of from 0.1 to 10%, more preferably in the range of from 0.5 to 7%, these percentages being by weight. The polymer may also contain an amount, preferably not exceeding 10%, of another copolymerizable monomer, for example, an ester of an unsaturated acid, such as ethyl, propyl or butyl acrylate or methacrylate, or a vinyl compound, for example, styrene, •-methylstyrene or a corresponding compound bearing an alkyl substitutent on the phenyl ring, for instance, a p-alkylstyrene such as p-methylstyrene. The amount of diene and/or nitrile monomer will have to be decreased accordingly to result in a total of a 100%. The polymer preferably is a solid that has an average molecular weight in excess of 60,000, more preferably in excess of 100,000 g/mol.

The polymer that is preferably to be hydrogenated can be made in known manner, by emulsion or solution polymerization, resulting in a statistical polymer. The polymer preferably will have a backbone composed entirely of carbon atoms. It will have some vinyl side-chains, caused by 1,2-addition of the conjugated diene during the polymerization. It will also have double bonds in the backbone from 1,4-addition of the diene. Some of these double bonds will be in the cis and some in the trans orientation. Preferably these carbon-carbon double bonds are selectively hydrogenated, without concomitant hydrogenation of the nitrile and carboxyl groups present in the polymer. A suitable process can be found in Canadian Application 2,308,876.

Preferred catalysts include tris-(triphenylphosphine)-rhodium(I)-chloride, tris(triphenylphosphine)-rhodium(III)-chloride and tris-(dimethylsulphoxide)-rhodium(III)-chloride, and tetrakis-(triphenylphosphine)-rhodium hydride of formula $((C_6H_5)_3P)_4RhH$, and the corresponding compounds in which triphenylphosphine moieties are replaced by tricyclohexylphosphine moieties. The catalyst can be used in small quantities. An amount in the range of 0.01 to 1.0%, preferably 0.03% to 0.5%, more preferably 0.06% to 0.12% most preferably 0.08%, by weight based on the weight of polymer.

The catalyst is preferably used with a co-catalyst that is preferably triphenylphosphine. The co-catalyst ligand is preferably used in an amount in the range of from 0.3 to 5%, more preferably 0.5 to 4% by weight, based on the weight of the terpolymer. Preferably, the weight ratio of the rhodium-containing catalyst compound to co-catalyst is in the range 1:3 to 1:55, more preferably in the range 1:5 to 1:45. The weight of the co-catalyst, based on the weight of one hundred parts of rubber, is in the range of from 0.1 to 33, preferably 0.5 to 20 and more preferably 1 to 5, most preferably greater than 2 to less than 5.

A co-catalyst ligand is beneficial for the selective hydrogenation reaction. There should be used no more than is necessary to obtain this benefit, however, as the ligand will be present in the hydrogenated product. For instance triphenylphosphine is difficult to separate from the hydrogenated product, and if it is present in any significant quantity may create some difficulties in processing of the product.

The hydrogenation reaction can be carried out in solution. The solvent must be one that will dissolve carboxylated nitrile rubber. This limitation excludes use of unsubstituted aliphatic hydrocarbons. Suitable organic solvents are aromatic compounds including halogenated aryl compounds of 6 to 12 carbon atoms. The preferred halogen is chlorine and the preferred solvent is a chlorobenzene, more preferably monochlorobenzene.

The reaction can be carried out in a wide range of pressures, from $10 \times 10^5$ to $250 \times 10^5$ Pa. Temperatures from 60 to 160° are suitable. Under these conditions, the hydrogenation is usually completed in 3 to 7 hours. Preferably the reaction is carried out, with agitation, in an autoclave.

Hydrogenation of carbon-carbon double bonds improves various properties of the polymer, particularly resistance to oxidation. It is preferred to hydrogenate at least 80% of the carbon-carbon double bonds present. For some purposes it is desired to eliminate all carbon-carbon double bonds, and hydrogenation is carried out until all, or at least 99%, of the double bonds are eliminated. For some other purposes, however, some residual carbon-carbon double bonds may be required and reaction may be carried out only until, about, 90% or 95% of the bonds are hydrogenated. The degree of hydrogenation can be determined by infrared spectroscopy or $^1H$-NMR analysis of the polymer.

In some circumstances the degree of hydrogenation can be determined by measuring iodine value. This is not a particularly accurate method, and it cannot be used in the presence of triphenyl phosphine, so use of iodine value is not preferred.

It can be determined by routine experiment what conditions and what duration of reaction time result in a particular degree of hydrogenation. It is possible to stop the hydrogenation reaction at any pre-selected degree of hydrogenation. The degree of hydrogenation can be determined by ASTM D5670-95. See also Dieter Brueck, Kautschuk+Gummi Kunststoffe, Vol 42, No. 2/3 (1989).

As stated, it is believed that the hydrogenation of carbon-carbon double bonds is not accompanied by reduction of carboxyl groups. The possibility exists, however, that reduction of carboxyl and nitrile groups may occur to an insignificant extent, and the present invention is considered to extend to encompass any process or production in which insignificant reduction of carboxyl groups has occurred. By insignificant is meant that less than 0.5%, preferably less than 0.1%, of the carboxyl or nitrile groups originally present have undergone reduction.

To extract the polymer from the hydrogenation mixture, the mixture can be worked up by any suitable method.

According to the present invention, the base polymer itself, carboxylated nitrile rubber (XNBR), or the hydrogenated carboxylated nitrile rubber (HXNBR) of the present invention are to be crosslinked in the presence of, or reacted with, at least one coupling/condensing agent. Suitable coupling/condensing agents include agents that are capable of reacting with the repeating units in the polymer created by the preferably alpha,beta-unsaturated acid monomer. Thus, preferably every agent capable to react with a carboxylic group is thought to be useful in the present invention. Those agents are well known from conventional chemistry (e.g. Organic Chemistry, K. P. C Vollhardt, W H Freeman & Company, p. 747–789) and include agents that protect or transform the hydroxy group leading to carboxylate anions, alkanoyl (acyl) halides, anhydrides, esters, ketones, imides or O-acylurea derivatives. Examples of such agents include $SOCl_2$, $PCl_5$, $PBr_3$, oxalyl chloride, phosgene, trifluoroacetic anhydride, organometallic agents (i.e. methyllithium), diazomethane, alcohols, and carbodiimides.

Preferred coupling agents include carbodiimides and their derivatives (RN=C=NR), such as methylpropylcarbodiimide, dibutylcarbodiimide, hexamethylenecarbodiimide, diphenyl carbodiimide, where dicyclohexylcarbodiimide (DCC) is preferred.

The coupling/condensing reactions can be carried out in the presence or absence of solvents. The coupling/condensing agent or agents are preferably present in an amount in the range of from 1 to 12 phr, more preferably from 1 to 5. They can be added to the polymer before or after hydrogenation or the recovery process. It can be useful to add them on a suitable mixing device as a mill or a Banbury mixer or an extruder. Usually the coupling/condensing agent will form a covalent bond with the polymer chain, suitable coupling/condensing agents will form a bond between two or more polymer chains. The number of bonds formed is dependent on the reactivity and/or the functionality of the coupling/condensing agent(s). It might be advantageous to use three or higher coupling/condensing functionalities within the reagents instead of one or two coupling/condensing sites.

Usually the bonds formed during the coupling/condensing process are not reversible, especially if a coupling product, such as e.g. water or urea is formed. However, it might be advantageous to form reversible bonds by dipolar interactions between the polymer chains that are induced by the condensing/coupling agent. It is advantageous to perform the inventive coupling/condensing reaction simultaneous with a conventional crosslinking/vulcanization reaction. For the conventional crosslinking/vulcanization reaction sulfur or sulfur-containing vulcanizing agents can be used in known manner (see e.g. I. Franta, Elastomers and Rubber Compounding Materials, Elsevier, Amsterdam 1989, Chapter 6). Sulfur vulcanization requires that there be some unsaturated carbon-carbon double bonds in the polymer, to serve as reactions sites for addition of sulfur atoms to serve as crosslinks. If the polymer is to be sulfur-vulcanized, therefore, the degree of hydrogenation is controlled to obtain a product having a desired number of residual double bonds. For many purposes a degree of hydrogenation that results in about 3 or 4% residual double bonds (RDB), based on the number of double bonds initially present.

The XNBR or HXNBR of the present invention can be crosslinked with peroxide crosslinking agents, again in any known manner. Peroxide crosslinking does not require the presence of double bonds in the polymer, and results in carbon-containing crosslinks rather than sulfur-containing crosslinks. As peroxide crosslinking agents there are mentioned dicumyl peroxide, di-t-butyl peroxide, benzoyl peroxide, 2,5-dimethyl-2,5-di(t-butylperoxy)-hexyne-3 and 2,5-dimethyl-2,5-di(benzoylperoxy)hexane and the like. They are preferably used in amounts in the range of from 0.2 to 20 parts by weight, more preferably 1 to 10 parts by weight, per 100 parts of rubber.

The crosslinking can also be effected by means of a multivalent ion, especially a metal ion, that is ionically bound to carboxyl groups on two different polymer chains. This may be done, for example, with zinc, magnesium, calcium or aluminum salts.

The polymer of the present invention can be compounded with any of the usual compounding agents, for example active or inactive fillers such as carbon black or silica, heat stabilizers, antioxidants, activators such as zinc oxide or zinc peroxide, curing agents co-agents, processing oils and extenders. Such compounds and co-agents are known to persons skilled in the art.

The optionally hydrogenated carboxylated nitrile rubbers of the present invention display improvements in mechanical strengths, excellent adhesive properties and, especially, excellent hot tear strength that is much better than that of non-carboxylated nitrile rubber. The rubbers of the present invention also display better heat aging resistance and better low temperature flexibility than non-hydrogenated carboxylated nitrile rubber. They also display excellent abrasion resistance, and good adhesion at both low and high temperature. These properties render them valuable for many specialized applications, such as use as adhesives, part of adhesive compositions, and seals in situations where severe stress is encountered, high stiffness automotive belts, roll covers, and hoses which will be elaborated below.

The rubbery XNBR/HXNBR of the present invention displays good adhesion to materials, including fabrics, woven and non-woven, metals and plastics, especially plastics with polar groups. The XNBR/HXNBR will adhere to fabrics of natural fibers, for example wood, cotton, hemp, silk, to synthetic fibers, for example polyamides, polyesters, polyolefins such as polyethylene and polypropylene, poly (meth)acrylonitriles and aramid fibers. It will also adhere well to glass fibers and steel cords. The XNBR/HXNBR (nitrile rubber) displays particularly good adhesion when the substrate to which it is applied also bears polar groups. A particularly surprising and valuable feature of XNBR/HXNBR is that the good adhesion is maintained at elevated temperature, whereas hydrogenated nitrile rubber (HNBR) and carboxylated nitrile rubber (XNBR) both display good adhesion at room temperature but less good adhesion at elevated temperature. These properties render the XNBR/HXNBR valuable in applications, for example belts, where a polymer coating material is affixed as an impregnant and cover of fabric material, especially for any application where the belt may encounter heat.

The inventive nitrile rubbers are used in many specialized applications where difficult conditions are encountered. Condensed/coupled carboxylated nitrile rubbers of the present invention have physical properties that are superior in some respects to those of commercially available nitrile rubbers and hence are useful in many applications where nitrile rubbers are of proven utility. Mention is made of seals, especially in automotive systems and heavy equipment and any other environment in which there may be encountered high or low temperatures, oil and grease. Examples include wheel bearing seals, shock absorber seals, camshaft seals, power steering assembly seals, O-rings, water pump seals, gearbox shaft seals, and air conditioning system seals. Mention is made of oil well specialties such as packers, drill-pipe protectors and rubber stators in downhole applications. Various belts, hoses and mountings provide demanding environments and the properties of XNBR/HXNBR of the present invention render it suitable for applications in air conditioning hoses, camshaft drive belts, oil-cooler hoses, poly-V belts, torsional vibration dampeners, boots and bellows, chain tensioning devices, overflow caps and power steering hoses. The high modulus and high abrasion resistance of XNBR/HXNBR renders it useful for high-hardness roll applications in, for instance, metal-working rolls, paper industry rolls, printing rolls, elastomer components for looms and textile rolls. The good abrasion resistance and good adhesion to metals of XNBR/HXNBR renders it suitable for use in bearing pads attached to tracks of tracked vehicles such as bulldozers and other large items of earth moving equipment, military tanks, and the like.

The material to which the polymer of the present invention is to adhere may be subjected to treatment to enhance bonding before being contacted with the polymer. For instance, cotton rayon or nylon may be dipped in a mixture that is composed of an aqueous solution of an initial condensate of resorcinol and formaldehyde (referred to as RF) and a rubber latex, this mixture being referred to as RFL. The rubber latex is not limited but may be an acrylonitrile/butadiene copolymer latex, and acrylonitrile/butadiene/methacrylic acid copolymer latex, an acrylonitrile/butadiene/acrylic acid copolymer latex or an acrylonitrile/butadiene/vinylpyridine copolymer latex.

The present invention is further illustrated in the following examples.

EXAMPLES

Example 1
Crosslinking of HXNBR

HXNBR (24 g) was milled at 40° C. to incorporate Dicyclohexylcarbodiimide (DCC) (0.9 g). Crosslinking occurs as milling proceeds. The polymer was pressed at 150° C. at 40,000 psi for 2 minutes. ATR analysis of the polymer shows the disappearance of the —N=C=N— stretch of the starting material in the 2273-2000 cm-1 region and the appearance of a C=O peak at 1802 cm-1. An increase in C=O absorbance at 1622 and 1574 cm-1 is also observed.

Example 2
Pulverized HXNBR

HXNBR (20 g) was milled as disclosed in Example 1 at 40° C. and Dicyclohexylcarbodiimide (2.4 g) added to the mill. Pulverization of the polymer occurs after several passes on the mill. ATR analysis shows the presence of Dicyclohexylcarbodiimide residue 2116 cm-1 (—N=C=N—) as well as the product C=O 1803, 1624, 1574 cm-1.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for crosslinking a polymer having units derived from at least one conjugated diene monomer, units derived from at least one unsaturated nitrile monomer and units derived from at least one derived unsaturated acid monomer, comprising the step of crosslinking the polymer in the presence of one or more coupling/condensing agent(s), wherein the polymer is hydrogenated and wherein the coupling/condensing agent is $SOCl_2$, $PCl_5$, $PBr_3$, oxalyl chloride, phosgene, trifluoroacetic anhydride, organometallic agents, diazomethane, alcohols, and carbodiimides or their derivatives having the general formula RN=C=NR.

2. A process according to claim 1, wherein the coupling/condensing agent is methylpropylcarbodiimide, dibutylcarbodiimide, hexamethylenecarbodiimide, diphenyl carbodiimide or dicyclohexylcarbodiimide.

3. A process according to claim 1, wherein the amount of coupling/condensing agent(s) is in the range 1 to 12 parts by weight per hundred parts by of polymer.

4. A process according to claim 1, wherein the polymer has been selectively hydrogenated until at least 80% of the carbon-carbon double bonds have been hydrogenated.

5. A process according to claim 4, wherein the selective hydrogenation is carried out until at least 95% of the carbon-carbon double bonds have been hydrogenated.

6. A process according to claim 1, wherein the polymer comprises in the range of from 85 to 40% by weight of conjugated diene, in the range of from 0.1 to 10% by weight of α,β-unsaturated carboxylic acid and in the range of from 14.9 to 50% by weight of acrylonitrile or methacrylonitrile or a mixture thereof.

7. A statistical polymer comprising units derived from at least one conjugated diene monomer, units derived from at least one unsaturated nitrile monomer and units derived from at least one derived unsaturated acid monomer, wherein the polymer is hydrogenated, wherein at least 50% of the units originating from the unsaturated acid monomer have been reacted with the coupling/condensing agent, wherein the coupling/condensing agent is $SOCl_2$, $PCl_5$, $PBr_3$, oxalyl chloride, phosgene, trifluoroacetic anhydride, organometallic agents, diazomethane, alcohols, and carbodiimides or their derivatives having the general formula RN=C=NR.

8. A polymer according to claim 7, wherein at least 80% of the units originating from the unsaturated acid monomer have been reacted with the coupling/condensing agent.

9. A polymer according to claim 6, wherein at least 80% of carbon-carbon double bonds have been selectively hydrogenated.

10. An article comprising a substrate and a polymer having units derived from at least one conjugated diene monomer, units derived from at least one unsaturated nitrile monomer and units derived from at least one derived unsaturated acid monomer, wherein the polymer is hydrogenated, wherein at least 50% of the units originating from the unsaturated acid monomer have been reacted with the coupling/condensing agent and wherein the polymer is adhered to the substrate, and wherein the coupling/condensing agent is $SOCl_2$, $PCl_5$, $PBr_3$, oxalyl chloride, phosgene, trifluoroacetic anhydride, organometallic agents, diazomethane, alcohols, and carbodiimides or their derivatives having the general formula RN=C=NR.

11. An article according to claim 10 wherein the substrate comprises a polyamide.

12. An article according to claim 10 wherein the polyamide is in the form of fiber and the polyamide fiber and the polymer is in the form of a belt.

13. A polymer according to claim 7, in the form of a seal, a roll cover or a pad for attachment to a track for a tracked vehicle.

* * * * *